United States Patent
Rink et al.

(10) Patent No.: US 7,228,133 B2
(45) Date of Patent: Jun. 5, 2007

(54) MOBILE IP NODE DEVICE AND ACCESS INFORMATION

(75) Inventors: Fred Rink, Fairview, TX (US); Steven Currin, McKinney, TX (US); Jerry Mizell, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 180 days.

(21) Appl. No.: 10/741,954

(22) Filed: Dec. 19, 2003

(65) Prior Publication Data

US 2005/0136920 A1 Jun. 23, 2005

(51) Int. Cl.
*H04Q 7/20* (2006.01)

(52) U.S. Cl. .............. 455/433; 455/432.1; 455/435.1; 455/435.5; 455/422.1

(58) Field of Classification Search .............. 455/433, 455/432.1, 432.2, 435.1, 435.2, 552.1, 553.1, 455/422.1, 435.5; 370/457, 466, 337, 347; 380/270
See application file for complete search history.

(56) References Cited

U.S. PATENT DOCUMENTS

| | | | | |
|---|---|---|---|---|
| 6,731,933 B2 * | 5/2004 | McCormick | ............. | 455/432.1 |
| 6,760,444 B1 * | 7/2004 | Leung | ......................... | 380/270 |
| 6,925,297 B2 * | 8/2005 | Wenzel | ....................... | 455/411 |
| 2002/0174175 A1 * | 11/2002 | Zhu et al. | ................... | 709/203 |
| 2003/0133426 A1 * | 7/2003 | Schein et al. | ............... | 370/337 |
| 2003/0235174 A1 * | 12/2003 | Pichna et al. | .............. | 370/338 |
| 2004/0210524 A1 * | 10/2004 | Benenati et al. | ............. | 705/40 |
| 2005/0021770 A1 * | 1/2005 | Helm et al. | ................ | 709/228 |

* cited by examiner

*Primary Examiner*—Lester G. Kincaid
*Assistant Examiner*—Sayed T. Zewari
(74) *Attorney, Agent, or Firm*—Garlick Harrison & Markison; James A. Harrison; Kevin L. Smith

(57) ABSTRACT

A method and apparatus in accordance with the present invention includes a home agent and a mobile terminal that communicate to facilitate the home agent becoming aware of a device type and access technology being used to gain access to a network by way of the home agent so that the home agent may provide appropriate billing and network control. More specifically, the mobile IP registration process according to a mobile IP protocol is modified to add parameter extensions that allow the mobile terminal to provide this information. The two specific parameters that are added include one that defines the access technology and another that defines the device type in the described embodiments of the present invention. Specifically, the extension that defines the access technology includes a mobile IP client that has operator definable configurations that relate to the access technology. The mobile IP client specifies whether a wireless local area network or wireless cellular network is being used and, in one embodiment of the invention, which type of wireless local area network or cellular network is being used.

20 Claims, 5 Drawing Sheets

Communication network

MOBILE IP NODE DEVICE AND ACCESS INFORMATION

BACKGROUND

1. Technical Field

The present invention relates to mobile communication devices and, more particularly, the present invention relates to mobile terminals communicating in a mobile IP network.

2. Related Art

The Internet, as we know it today, began as a joint project between the Department of Defense's (DoD's) Advanced Research Project Agency (ARPA) and the United Kingdom's National Physics Lab (NPL) during the height of the Cold War. When planning started in 1967, the project was conceived to distribute communications and data through a dispersed network of highly interconnected network nodes with high redundancy. A decision was made, based on research at the NPL, to move data through the network using a technique called "message switching", or packet switching as it is called today. In order to exchange data, each node was assigned a unique address in relation to the addresses assigned to all other nodes. The address scheme devised was a 32-bit number comprising a network part and a host (network node) part. By 1971, 15 nodes, mostly at universities, were connected to the ARPA network (ARPANET). They were linked for time sharing to support a variety of remote terminals and allowed data transfers between distant computers.

The early 1970s produced a number of products that would effect the development of the ARPANET. The Palo Alto Research Center (PARC), funded by Xerox Corporation, developed a graphical user interface (GUI), a computer pointing device called a mouse, and most importantly, an Ethernet protocol, for inter-connecting computers that allowed users to send and receive electronic mail and share files.

At the same time that ARPANET was being develop for institutional use, the first personal computer was introduced by Altair in 1975. Sold as a kit, it was an instant success with computer enthusiast but its sales were limited due to the technical skill required to assemble the kit. It did, however, confirm that a market existed for a personal computer. Thus, in 1981, International Business Machines (IBM) introduced the Personal Computer (PC) which became the defacto industry standard. The IBM PC was an open architecture machine, meaning IBM published all technical details of the PC. This fact allowed low cost providers to produce PC "clones" so consumers were able to purchase personal computers at affordable prices. Low cost dial-up modems allowed PC users to download files from bulletin boards.

By the late 1980s, the ARPANET was almost 20 years old. The DoD split the ARPANET into two distinct parts for specific uses. One part was reserved for military sites (known as MILNET), while the second part of the ARPANET was for civilian use. Management of the ARPANET was turned over to the National Science Foundation (NSF) with NSF regional networks forming the backbone of the re-named Internet. Commercial Internet Service Providers (ISPs) began offering Internet Access Points (APs) through which large numbers of PC users began accessing the Internet. These PCs were desktop machines whose location was not likely to change, thus creating a home network for ISPs.

As technology evolved, smaller, more powerful laptop PCs became available. Their size released them from the desktop and the office. Sales, marketing, and technical personnel could take the laptop PCs on the road while maintaining contact with the office through remote applications such as e-mail and file transfers. These laptop PCs created mobile users that wanted to access the Internet while moving between networks, thereby causing a transition from a centralized system to a distributed system. Moreover, advances in wireless technology made wireless networking possible. Using a mobile IP protocol, laptop PCs, personal digital assistants (PDAs) and mobile phones equipped for web browsing could access the Internet. Using either a static or dynamic mobile IP address assigned by their home networks, these mobile users or mobile terminals accessed the Internet from any available Internet access point.

Along these lines, mobile and simple IP standards have evolved to facilitate mobility for wireline and wireless coupled user terminals (hereinafter, "mobile terminals"). When a mobile terminal changes its access point from its home network to a visited (foreign) network, it does not change its mobile IP address. Home agents (HA) are special servers responsible for routing data packets to absent mobile terminals. The HA is informed of the absent mobile terminal's location when the mobile terminal registers with the foreign network. The server on the foreign network, the foreign agent (FA), provides its IP address (care-of address) to the HA during mobile terminal registration. After registration, the FA is responsible for routing data packets between the mobile terminal and home network via the HA.

Within the world of wireless communications, differing billing rates and services are often offered according to time of day, quality of service and guaranteed throughput rates. For example, some services are offered in which a certain type of continuous-bit-rate data, so called streaming data, is provided at a specified price. For example, there are subscription based music and video services that are readily available. There are also subscription based stock market services and other services in which data is provided for a fee. While such application specific services often are offered at a flat rate, data rate guarantees result in differing transmission rates. Moreover, as the different technologies evolve, the access technology that is utilized to gain access to various application servers is also rate dependent. For example, if an access technology includes a cellular network to provide access to the Internet, then the access technology on its own provides a use based rate. Moreover, if certain quality of service or throughput rates are expected or guaranteed for the access, then different rates may apply according to the throughput rate which is requested or used. On the other hand, if a wireless local area network is used to provide access to a data packet network, such as the Internet, then there may be no service fees associated therewith aside from, perhaps, monthly fees.

One problem that exists for a home agent in a mobile IP or in a simple IP network is that home agents do not currently know in real time either a device type or access technology being used to establish a communication link. Because home agents do not know either the device type or access technology, home agents are not able to properly determine an appropriate billing rate, whether access should be allowed or disallowed, and other control related considerations. Accordingly, a need exists for enabling a home agent to determine device type and access technology.

SUMMARY OF THE INVENTION

A method and apparatus in accordance with the present invention includes a home agent and a mobile terminal that communicate to facilitate the home agent becoming aware of a device type and access technology being used to gain access to a network by way of the home agent so that the home agent may provide appropriate billing and network control. More specifically, the mobile IP registration process according to a mobile IP protocol is modified to add parameter extensions that allow the mobile terminal to provide this information. The two specific parameters that are added include one that defines the access technology and another that defines the device type in the described embodiments of the present invention. Specifically, the extension that defines the access technology includes a mobile IP client that has operator definable configurations that relate to the access technology. The mobile IP client specifies whether a wireless local area network or wireless cellular network is being used and, in one embodiment of the invention, which type of wireless local area network or cellular network is being used. For example, the wireless local area network technology can include any one of 802.11(a), 802.11(b), 802.11(g), or Bluetooth. With respect to the cellular network, the access technology type may be any one of cdma2000, 1xEV-DO, 1xEVDD, Universal Mobile Telecommunications System (UMTS), General Packet Radio Service (GPRS), or other such standards based specification. Similarly, the parameter extension that defines the device type enables the mobile IP client to specify whether the device type is a laptop, a personal digital assistant (PDA), a game device, a cellular phone, a personal computer, a wireless mobile terminal, a digital pager device, or any other device type presently available and/or under development. The device type, as defined by a code, and the access technology are sent from the mobile terminal to the home agent in a mobile IP registration request. The home agent then uses the received access technology and device type, among others, for determining an appropriate billing rate for a particular data session and even whether a access is allowable according to an associated subscriber profile for the mobile terminal.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
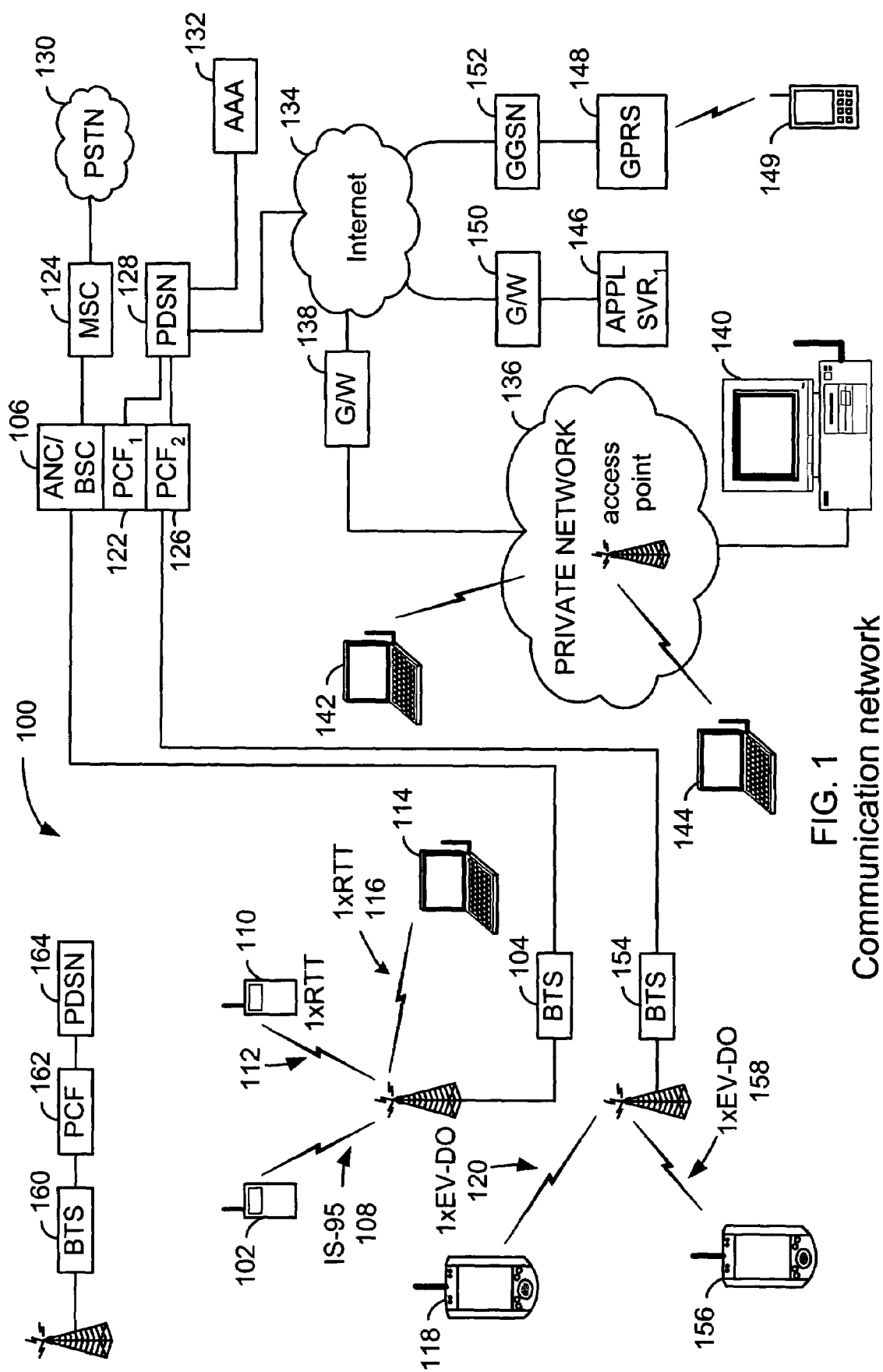
FIG. 1 is a functional block diagram of a communication network formed according to one embodiment of the present invention.

FIG. 1 is a functional block diagram of a communication network formed according to one embodiment of the present invention. As may be seen, a communication network 100 includes many networks that are coupled to operatively communicate with each other to enable a user in one type of network to communicate with a user in a different type of network. For example, the communication network 100 creates an ability for a wire line user terminal coupled to a private network to communicate with a mobile terminal through a wireless communication link. Such transparent operation with respect to the user is improving access to information and the ability for individuals to communicate to a level that is unprecedented. Existing wireless networks have, heretofore, been adapted primarily for carrying voice calls. Accordingly, when used in conjunction with a computer terminal, the wireless voice networks were able to transmit or receive data at rates that today are viewed as unacceptably slow although they were appreciated at the outset.

Along these lines, a mobile station 102 is located within a geographic area served by a Base Transceiver Station (BTS) 104 that is coupled to an Access Network Controller (ANC)/Base Station Controller (BSC) 106. More specifically, mobile station 102 communicates with BTS 104 by way of an IS-95 CDMA wireless communication network link shown generally at 108. Similarly, a mobile terminal 110 that is capable of supporting both voice and data calls communicates with BTS 104 over a wireless communication link shown generally at 112 and establishes either voice calls or data calls under cdma2000 1xRTT protocols. In the example herein, mobile terminal 110 is engaged in a voice call, as defined by a service option generated by a mobile terminal during call setup, and thus wireless communication link 112 is transmitting merely voice signals and associated control signaling.

Similarly, a mobile terminal 114 is engaged in a data call (data session) according to 1xRTT protocols over a wireless communication link shown generally at 116. Finally, an access terminal 118 is engaged in a data session over a wireless communication link, shown generally at 120, according to 1xEV-DO protocols in a so called "simple-IP" or "mobile-IP" network, as those terms are understood by one of average skill in the art. In general, simple-IP and mobile-IP networks do not include control-signaling protocols that are as extensive as some existing systems including 1xRTT.

Continuing to examine FIG. 1, BTS 104 is generally coupled to communicate with ANC/BSC 106 (or with packet control function cards there within). As is understood by one of average skill in the art, access network controllers and base station controllers have similar functionality. Moreover, Packet Control Function (PCF) cards can be installed either within a BSC or within an ANC according to whether the PCF is to communicate with a 1xRTT device or a 1xEV-DO device, respectively. It is to be understood that the BSC and ANC elements may readily be formed as stand alone units, but are shown herein as combined systems for illustration.

Within ANC/BSC 106, a plurality of different wireless network cards is included to facilitate communications with mobile stations and mobile terminals of differing protocols and types. For example, in the described embodiment, ANC/BSC 106 includes circuitry to communicate with mobile station 102 over IS-95 CDMA wireless communication network link as shown generally at 108. ANC/BSC 106 further includes a PCF 122 for communicating with mobile terminals 110 and 114 utilizing 1xRTT protocols. As may be seen, PCF 122, which is for communicating with 1xRTT protocol devices, is coupled to a Mobile Switching Center (MSC) 124. A PCF 126, however, is for communicating with 1xEV-DO devices and thus it is coupled directly to a Packet Data Serving Node (PDSN) 128. Thus, access terminal 118 that communicates over wireless communication link 120 according to 1xEV-DO communication protocols, communicates with BTS 154 and with PCF 126 formed within ANC/BSC 106. It is understood, of course, that PCF 126 may readily be formed as a distinct device rather than within a rack of ANC/BSC 106. Moreover, PCF 126 may communicate with access terminal 118 through distinct radio equipment and, thus, through a BTS other than BTS 154 as shown herein.

MSC 124 further is coupled to a Public Switched Telephone Network (PSTN) 130. Accordingly, calls routed through MSC 124 are directed either to other MSCs (not shown herein) or to external networks by way of PSTN 130. The reference to PSTN herein includes SS7 and other similar "intelligent networks". 1xRTT data and 1xEV-DO calls, which are processed by PCF 126, however, are forwarded through PDSN 128, which, upon authentication by an Authentication, Authorization and Accounting (AAA) server 132, is connected to a data packet network, which, in this example, comprises Internet 134. As may further be seen, Internet 134 is coupled to a private network 136 by way of a gateway device 138. Private network 136 further is coupled through traditional wire line networks to a user terminal 140. Private network 136 is further coupled to mobile terminals 142 and 144 through a wireless network. In one embodiment, private network 136 comprises a wireless local area network with at least one access point which provides access for mobile terminals 142 and 144 and comprises wireless LAN terminals. Private network 136 can include home agents and foreign agents for mobile terminals 136 and 144. Alternatively, a PDSN, such as PDSN 128 or a Gateway GPRS Support Node (GGSN), such as GGSN 152 of a General Packet Radio Service (GPRS) network, may serve as a foreign agent or home agent.

Internet 134 further is coupled to application server 146 by way of gateway device 150. A Global System for Mobile Communications (GSM) mobile terminal 149 is coupled to Internet 134 by way of GPRS network 148. GPRS network 148 represents the GPRS architecture, such as base station controller, mobile switching center, and serving support nodes. GGSN 152 is the interface between Internet 134 and GPRS network 148.

Continuing to refer to FIG. 1, ANC/BSC 106 further is coupled to BTS 154, which is in communication with an access terminal 156 by way of a 1xEV-DO communication link 158. As may be seen, access terminal 156 is served by PCF 126, as is access terminal 118. Additionally, a BTS 160 is coupled to a PCF 162 that, in turn, is coupled to communicate with a PDSN 164. Thus, a mobile station, such as mobile station 102, may communicate with BTS 160, BTS 104, or both. PCF 162, as may be seen, is a standalone system rather than being integrated as a card in an ANC or a BSC.

As will be described in greater detail below, any one of the mobile terminals or access terminals may communicate with a device by way of Internet 134 through a home agent (HA) or a foreign agent (FA) depending on the Internet access point. In the described embodiment, the mobile terminal that is not within the service area of the HA will register directly with the HA or through the FA. The FA accesses network profile information and routes data packets according to the data packet destination address and/or the application type. Data packets not destined for the home network will be routed through Internet access points thereby reducing the amount of data packets transported by the home network infrastructure according to profile information, policy information, and/or according to a destination address. Accordingly, network resources are not unnecessarily used and efficiency is improved.

For each mobile terminal or access terminal, such as mobile terminals 118 and 156, that accesses Internet 134 or private network 136 by way of a home agent or foreign agent, the home agent, by virtue of the use of simple IP or mobile IP protocols, is not ordinarily able to determine the access technology or the device type and thus, as an example, is unable to select an appropriate billing rate for a particular call or data session. Accordingly, the mobile terminals of the present invention include logic for generating a registration request that includes parameter extensions to enable the mobile terminal to provide information regarding the access technology and device type to the home agent. Accordingly, the home agent can, by evaluating the device type and the access technology as specified in the parameter extensions of the registration request, can provide this information in the billing records for a particular service that is being requested and even determine whether the requested access is allowed for the device type and/or the access technology. For example, if the device type is a PDA, then according to the type of PDA, it may not be feasible to provide streaming video thereto either because the PDA cannot process that much data or because the communication link with the PDA cannot support the throughput rates that are required therefor.

Figure 2:
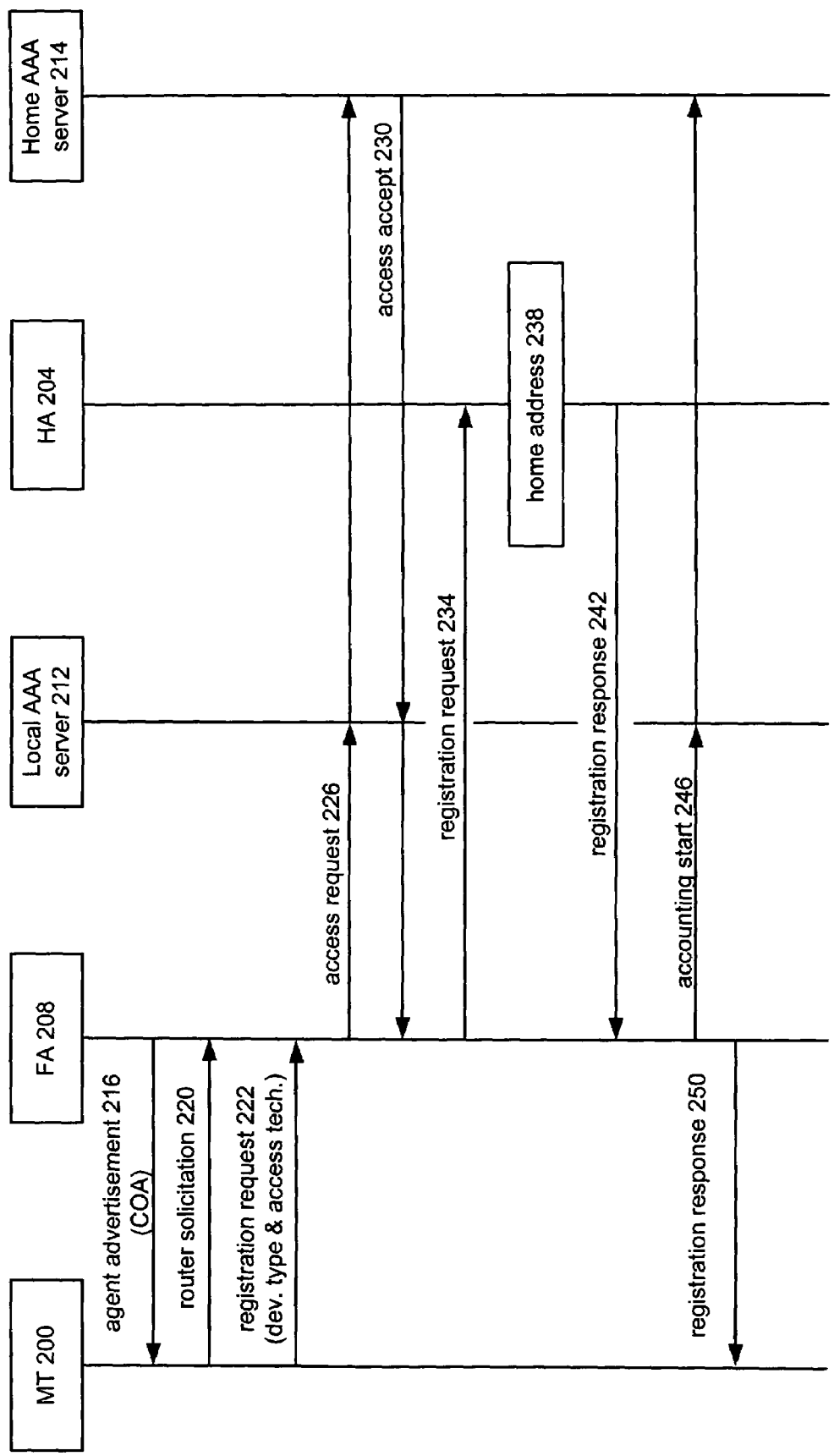
FIG. 2 is a signal sequence diagram that illustrates mobile terminal registration according to one embodiment of the present invention.

FIG. 2 is a signal sequence diagram that illustrates mobile terminal registration according to the present invention. Generally, the invention includes the mobile terminal advising a home agent, either directly or by way of a foreign agent, its device type and access technology being used to gain access in a registration request. The home agent then may perform billing or other control related functions that are responsive and correspond to the mobile terminal and the access technology. More generally, as mobile terminal (MT) 200 moves from its home network, a home agent (HA) 204 must update the location of the mobile terminal in a home list. HA 204 is a specially designated server that is responsible for receiving and forwarding data packets to the mobile terminal.

As the mobile terminal moves into a foreign (visited) network, it must register its location with its HA. The mobile terminal may use an FA, such as FA 208, to assist with this registration, if such an FA is present in the network. In order to obtain profile and other information for a mobile terminal, an FA, such as FA 208, will communicate with a local Authentication, Authorization, and Accounting (AAA) server 212 or with a home AAA server 214. To establish a communication link with MT 200, FA 208 will periodically send out an agent advertisement 216 containing a care-of address. The agent advertisement is a special IP packet periodically broadcast by home agents and foreign agents to notify mobile terminals of their location and that they are available for connectivity. The care-of address is the IP address of FA 208. In the event MT 200 does not receive agent advertisement 216, it will send router solicitation 220. Router solicitation 220 is a message sent by the mobile terminal to discover a foreign agent in order to obtain the care-of address. Upon the reception of either agent advertisement 216 or response to router solicitation 220, MT 200 registers with the HA. MT 200 will send registration request 222 containing its HA, home network information, device type and access technology.

FA 208 will, upon receiving the registration request, send access request 226 containing the mobile terminal identification (including device type and access technology) to local AAA server 208. The access request 226 is, generally, a signal for identifying the mobile terminal to establish accounting for services used. Local AAA server 208 is a specialized server that verifies MT 200 authentication. Local AAA server 208 then forwards access request 226 to home AAA server 214 which responds with access accept 230 for an authenticated mobile terminal to indicate the mobile terminal is authorized to access the Internet. Once authentication has been received, FA 208 sends registration request 234, containing the care-of address, to HA 204 which stores the care-of address in the MT 200 profile. When HA 204 receives a data packet addressed to MT 200, HA 204 will encapsulate the data packet with the care-of address and forward the encapsulated data packet to FA 208.

HA 204 returns a home address 238 with registration response 242. In general, registration response 242 is a reply from the HA to the mobile terminal used to complete the registration process. If MT 200 is assigned a static IP address, HA 204 returns the static IP address as the home address. For a dynamic addressing, HA 204 will assign an IP address and return the IP address as the home address with registration response 242. FA 208 sends accounting start 246 then sends registration response 250 to MT 200. MT 200 is now registered and can access the home network or any other data packet network. Based on device type and access technology specified in registration request 222, the HA/FA may properly determine how to route data, determine appropriate throughput rates, perform various firewall functions including allowing access to specified addresses, etc.

Figure 3:
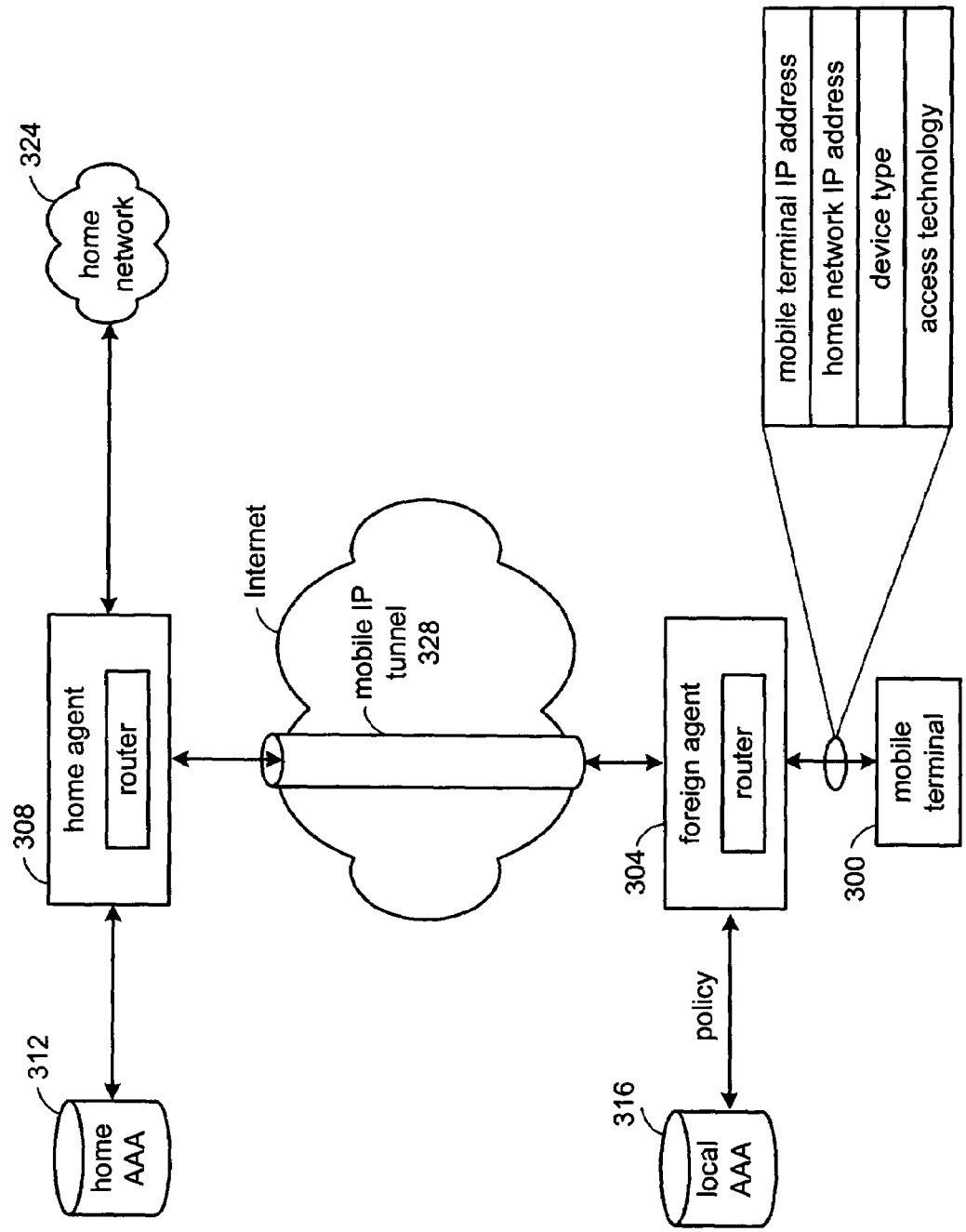
FIG. 3 is a functional block diagram that illustrates registration and call setup according to one embodiment of the present invention.

FIG. 3 is a functional block diagram that illustrates registration and call setup according to one embodiment of the present invention. More specifically, a mobile terminal 300 registers with foreign agent 304 and home agent 308 by way of mobile IP tunnel 328. During or subsequent to the registration process, foreign agent 304 receives mobile terminal information from home authentication, authorization and accounting (AAA) server 312 via local AAA server 316. When mobile terminal 300 attempts to access a data packet network, such as home network 324, foreign agent 304 will access AAA server 316 and route the data packets accordingly. As may be seen, mobile terminal 300 produces its mobile terminal IP address, home network IP address, device type and access technology in one or more communications with foreign agent 304. In the described embodiment, said information is transmitted in a registration request signal.

The routing is based upon one of a network policy and a subscriber policy in relation to, among other factors, device type and access technology. The network policy can specify routing data packets according to an address specified by the mobile terminal or based on an application type associated with the data packet. The application type includes home network 324 applications such as e-mail, file sharing, and establishing a session initiation protocol (SIP) for video conferencing and telephony over IP-based networks. If the application type is of a type specified for home network 324 and device type and access technology, foreign agent 304 will encapsulate the data packet creating mobile IP tunnel 328 for routing the data packet to home agent 308 for forwarding to home network 324. The data packet will be routed to the Internet if the application type is not of a type specified by the network policy. The network policy may also specify routing based on a destination address such as the address of a network node in home network 324.

Home AAA server 312 may also specify subscriber profile based routing policy based at least in part on one of the device type and access technology. Information stored in home AAA server 312 will be accessed by foreign agent 304 during registration via local AAA server 316. Foreign agent 304 will use the information received via local AAA server 316 when mobile terminal 300 accesses a data packet network. Foreign agent 304 will apply the subscriber profile for mobile terminal 300 to route the data packet according to at least one of a destination address, specified application type, device type and access technology.

Figure 4:
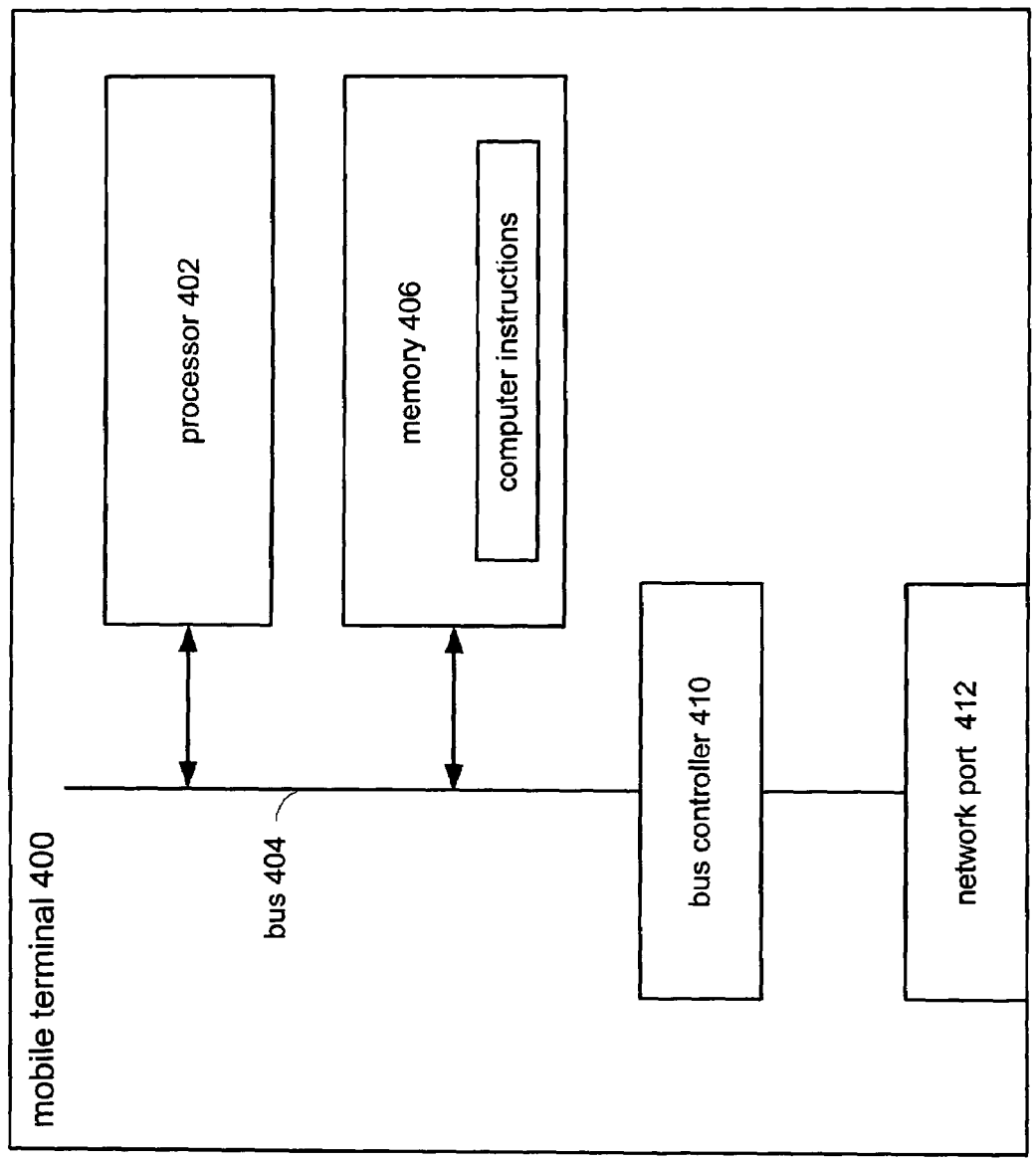
FIG. 4 is a functional block diagram of a mobile terminal that illustrates one embodiment of the present invention.

FIG. 4 is a functional block diagram of a mobile terminal that illustrates one embodiment of the present invention. Mobile terminal 400 includes a processor 402 that is coupled to communicate over a bus 404. A memory 406 further is coupled to bus 404 and is for storing computer instructions that define the operational logic of mobile terminal 400. Memory 406 specifically includes computer instructions to cause mobile terminal 400 to add device type and access technology to registration request messages. Bus 404 further is coupled to a bus controller 410, which controls the communications and timing of communications thereon. Bus controller 410 is further coupled to a network port 412 that enables mobile terminal 400 to communicate with a mobile IP network. Network port 412 can be one of any type of transceiver front end, including those used in wireless as well as wireline technologies.

In operation, processor 402 communicates with memory 406 by way of bus 404 to retrieve computer instructions stored therein and to execute the computer instructions to operate according to the logic defined within the computer instructions of memory 406. Memory 406 specifically includes computer instructions that define the logic for performing registration of a mobile terminal. Additionally, computer instructions stored in memory 406 define logic for determining an access technology by which the mobile terminal is to send the registration request and, more generally, communicate with one of a home agent or foreign agent.

Figure 5:
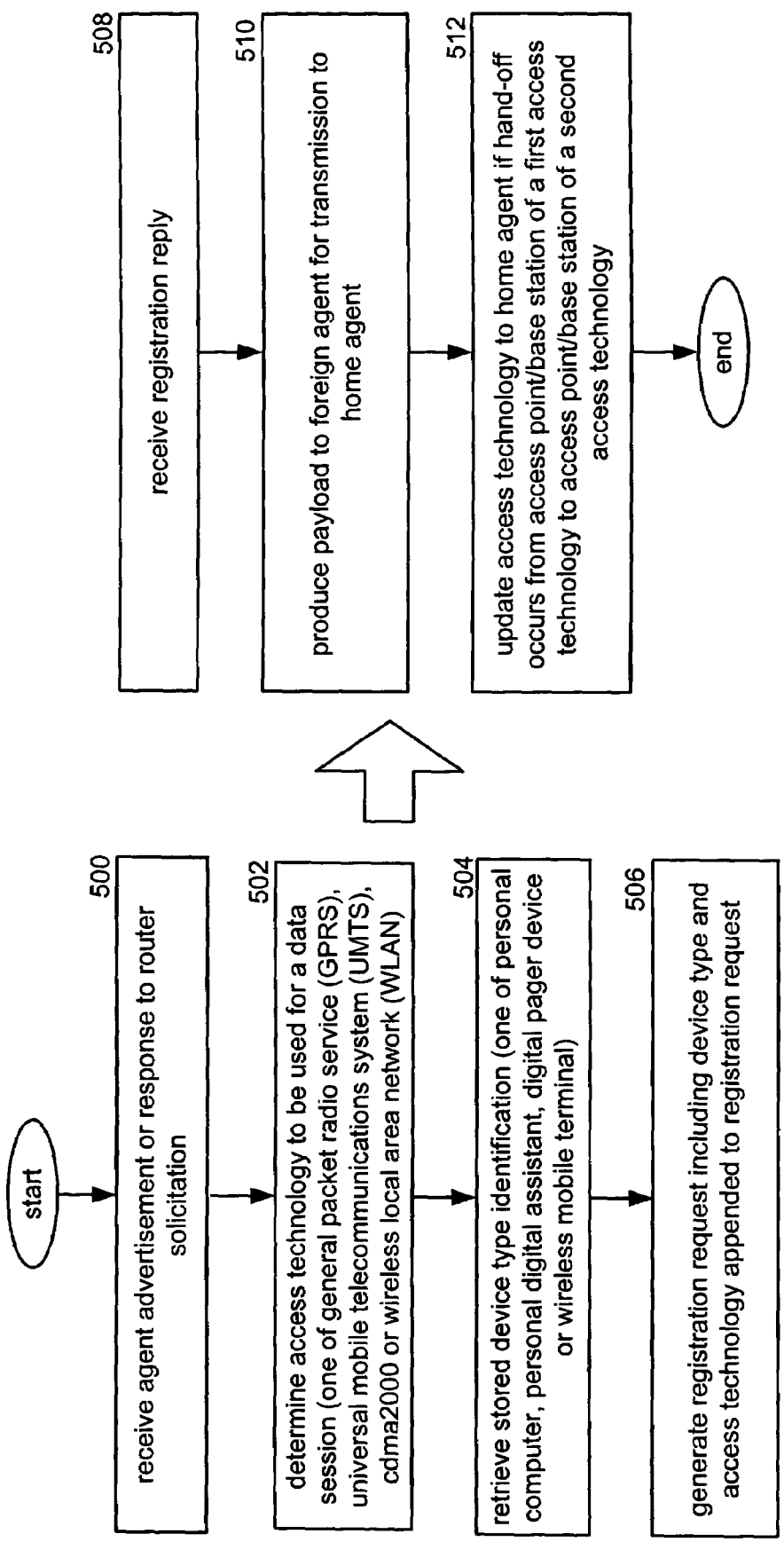
FIG. 5 is a flowchart illustrating one method according to the present invention.

FIG. 5 is a flowchart illustrating one method according to the present invention. A mobile terminal initially receives an agent advertisement or a response to a router solicitation that the mobile terminal transmitted in order to locate an access point (step 500). In a cellular network, the mobile terminal receives a beacon or paging signal that indicates the presence of a base station. The mobile terminal then determines the access technology that is to be used for a data session (step 502). The access technology, in one embodiment of the present invention, includes General Packet Radio Service (GPRS), Universal Mobile Telecommunications System (UMTS), cdma2000, or Wireless Local Area Network (WLAN). For example, if the mobile terminal receives an agent advertisement or response to a router solicitation, as well as a beacon or paging signal from a base station, the mobile terminal has a plurality of means for accessing a network. Thus, the mobile terminal may choose the cellular network to satisfy throughput requirements for a specified application, or may choose the lowest cost access technology which, more than likely, will be the WLAN since WLANs are typically operated by private organizations or individuals.

The mobile terminal further retrieves a stored device type identification (step 504). The device type identification, in the described embodiment of the invention, comprises one of a personal computer, personal digital assistant, digital pager device, or wireless mobile terminal. The stored device type identification may be even more specific, thereby identifying the particular model for the type of device. Thereafter, the mobile terminal generates a registration request that includes the device type and the access technology (step 506). In the described embodiment of the invention, the device type and access technology are appended to the registration request that is generated and transmitted to one of a base station or access point. Thereafter, the mobile terminal receives a registration reply (step 508) and produces a payload to a foreign agent for transmission to a home agent (step 510). If, during the data session, the mobile terminal experiences a hand-off from one of an access point or base station of a first access technology to an access point or base station of a second access technology, then the mobile terminal updates the specified access technology to the home agent so that corresponding accounting and service changes may be realized therefor (step 512).

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed:

1. A mobile IP network; comprising:
    a mobile terminal that is operable to generate a registration request to a foreign agent according to a mobile IP protocol, the registration request having at least two parameter extensions appended to the mobile IP protocol registration request, which two parameter extension are for carrying an indication of the access technology and an indication of device type;
    an Authentication, Authorization, and Accounting (AAA) server that is operable to receive from the foreign agent and processes the registration request with the indication of access technology and device type of the mobile terminal wherein the AAA server responds with subsequent transmissions that, in one of form and size, is based upon at least one of the access technology and device type; and
    wherein the AAA server is operable to perform billing and accounting functions with the received indications of access technology and device as received from the foreign agent.

2. An Authentication, Authorization, and Accounting (AAA) server for serving a mobile terminal in a mobile IP network, comprising:
    a processor for executing computer instructions that define operational logic of the AAA server;
    a bus coupled to the processor for transmitting computer instructions and control signals to and from the processor within the AAA server;
    a bus controller for controlling communications and timing of communications thereon;
    a network port for coupling the HA to a wireless communication network to enable the HA to communicate with the mobile terminal by way of a foreign agent;
    memory coupled to the bus, the memory including the computer instructions that define operational logic for routing data packets between the mobile terminal, the AAA server, the foreign agent and the mobile IP network according to a mobile IP protocol;
    wherein the AAA server receives a registration request from the mobile terminal according to the mobile IP protocol, the registration request including two added parameter extensions for including an indication of access technology being used by the mobile terminal corresponding to the registration request and an indication of device type of the mobile terminal; and
    wherein the AAA server processes subsequent responses to the mobile terminal based upon at least one of the access technology and device type and performs associated billing and accounting processing.

3. The AAA server of claim 2 wherein the access type is a General Packet Radio Service (GPRS).

4. The AAA server of claim 2 wherein the access type is a Universal Mobile Telecommunications System (UMTS).

5. The AAA server of claim 2 wherein the access type is cdma2000.

6. The AAA server of claim 2 wherein the access type is one of a Wireless Local Area Network (WLAN) and a wireline network.

7. The AAA server of claim 2 wherein the access type is one of 802.11(a), 802.11(b), 802.11(g) and Bluetooth.

8. The AAA server of claim 2 wherein the device type is a personal computer.

9. The AAA server of claim 2 wherein the device type is a game device.

10. The AAA server of claim 2 wherein the device type is a personal digital assistant.

11. The H AAA server A of claim 2 wherein the device type is a wireless mobile terminal.

12. The AAA server of claim 2 wherein the device type is a digital pager device.

13. A mobile terminal for use in a mobile IP network, comprising:
    a processor for executing computer instructions that define operational logic of the mobile terminal;
    a bus coupled to the processor for transmitting computer instructions and control signals to and from the processor within the mobile terminal;
    a bus controller for controlling communications and timing of communications thereon;
    transceiver circuitry for enabling the mobile terminal to communicate with an Authentication, Authorization, and Accounting (AAA) server by way of a communication network;
    memory coupled to the bus, the memory including the computer instructions that define operational logic for establishing a communication link with a home agent; and
    wherein the mobile terminal is operable to produce a registration request according to a mobile IP protocol, the registration request including two added parameter extensions for including an indication of access technology being used that corresponds to the registration request and an indication of device type of the mobile terminal.

14. The mobile terminal of claim 13 wherein the access type is one of General Packet Radio Service (GPRS), Universal Mobile Telecommunications System (UMTS), cdma2000 or Wireless Local Area Network (WLAN).

15. The mobile terminal of claim 14 wherein the access type is one of 802.11(a), 802.11(b), 802.11(g) and Bluetooth.

16. The mobile terminal of claim 13 wherein the device type is one of a personal computer, personal digital assistant, digital pager device or wireless mobile terminal.

17. A method by one of a mobile terminal and an Authentication, Authorization, and Accounting (AAA) server in a mobile IP network, comprising:
    determining one of a plurality of access technologies to use to access a home agent by way of one of an access point or a base station and further by way of a foreign agent; and
    processing a registration request, the registration request formed according to a mobile IP protocol, the registration request including two added parameter extensions for indicating the determined access technology being used by the mobile terminal corresponding to the registration request and a device type of the mobile terminal, the two added parameter extensions for providing information for the AAA server to use in accounting and billing functions.

18. The method of claim 17 wherein access technology is one of General Packet Radio Service (GPRS), Universal Mobile Telecommunications System (UMTS), cdma2000 or Wireless Local Area Network (WLAN).

19. The method of claim 18 wherein the WLAN is one of 802.11(a), 802.11(b), 802.11(g) and Bluetooth.

20. The method of claim 17 wherein the device type is one of a personal computer, personal digital assistant, digital pager device or wireless mobile terminal.

* * * * *